March 3, 1970  G. A. WOOD, JR  3,498,253
ELECTRIC POWER PACK FOR BOATS
Filed Sept. 25, 1967
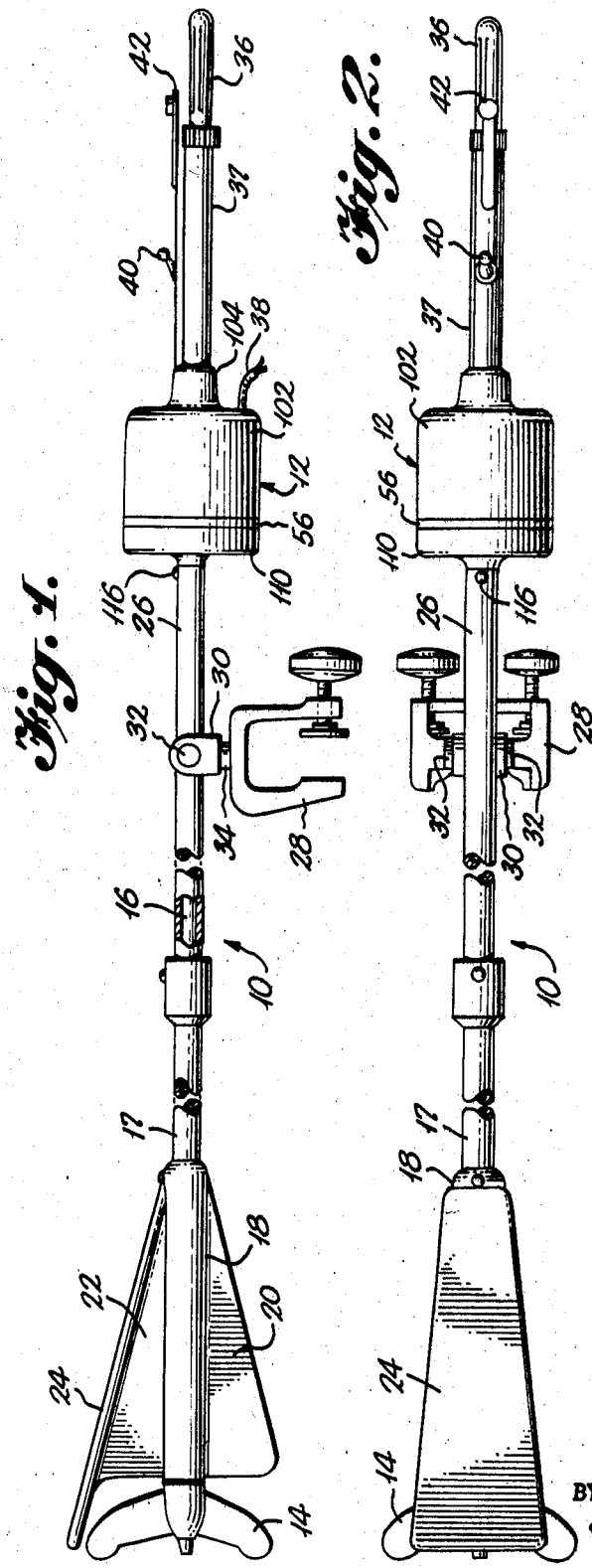
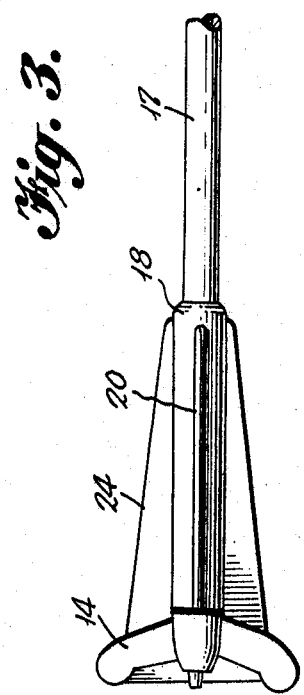
INVENTOR
Garfield A. Wood, Jr.
BY Lane, Aitken, Dunner & Ziems
ATTORNEYS

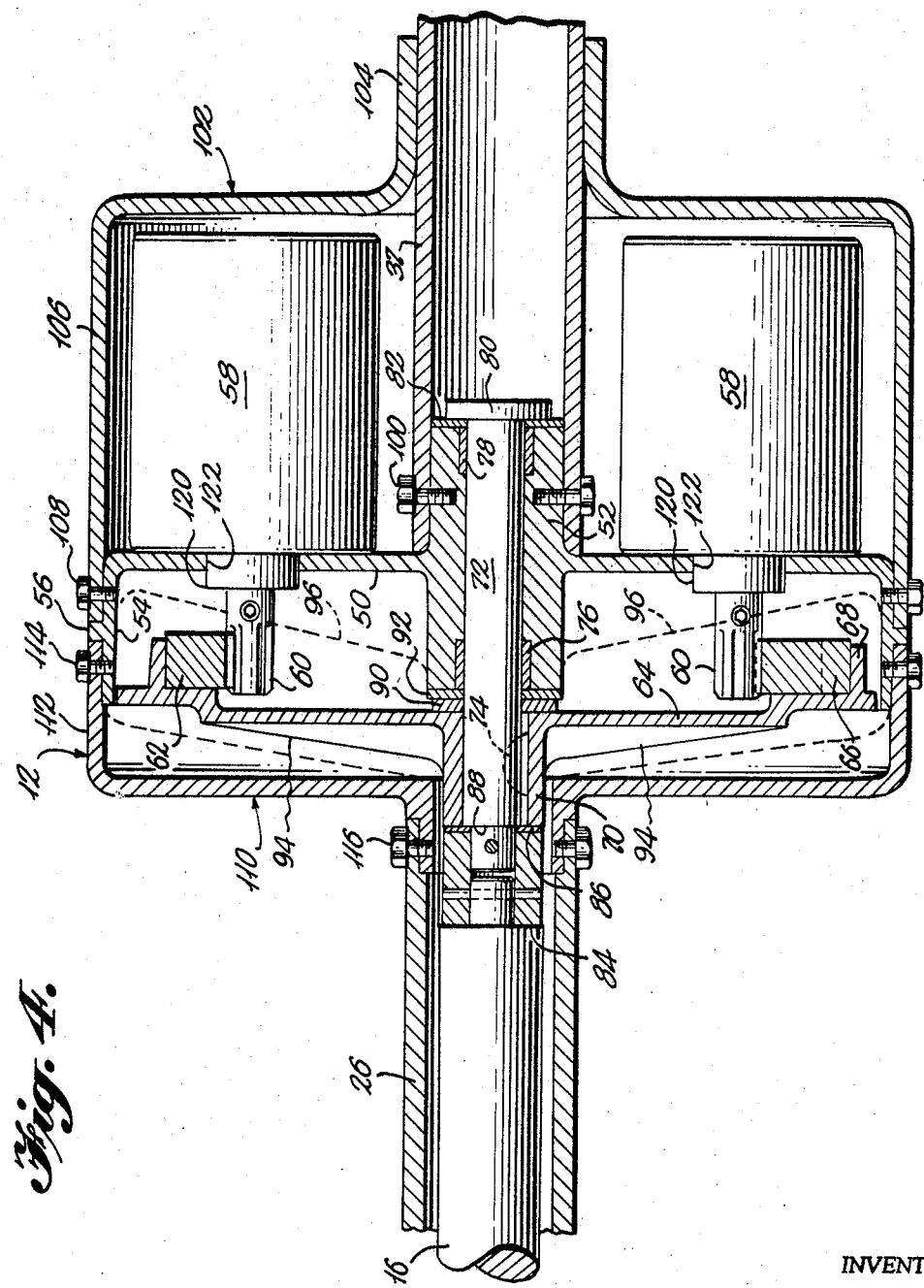

United States Patent Office 3,498,253
Patented Mar. 3, 1970

3,498,253
ELECTRIC POWER PACK FOR BOATS
Garfield A. Wood, Jr., 4565 Sabal Palm Road,
Bay Point, Miami, Fla. 33137
Filed Sept. 25, 1967, Ser. No. 670,224
Int. Cl. B63h 21/26
U.S. Cl. 115—18                     7 Claims

ABSTRACT OF THE DISCLOSURE

A portable electric power pack shaped similar to an oar having a propeller on the end thereof. A clamp is provided intermediate the ends of the oar for releasably clamping the power pack on the rear of the boat.

BACKGROUND OF THE INVENTION

My co-pending application Ser. No. 641,691 entitled Electric Power Unit, filed May 26, 1967, now abandoned discloses an electric power unit for wheeled vehicles such as bicycles and go-karts. The power unit briefly comprises a plurality of small (one-eighth horsepower) permanent magnet motors mounted on a housing in position to rotatably drive a molded plastic internal ring gear rotatably mounted within the housing. The number of electric motors used can be varied to vary the maximum power provided by the unit. The output is taken directly from the internal ring gear.

SUMMARY OF THE INVENTION

The present invention relates to an electric power pack for boats having a propeller driven directly by a power unit similar to that of my aforementioned co-pending application. In the preferred embodiment, the power unit is coaxially aligned with the axis of rotation of the propeller and the internal ring gear of the power unit is drivingly connected to the propeller. The plurality of small permanent magnet motors are positioned about the axis of rotation of the propeller with the axes of each of the motors parallel to the axis of rotation of the propeller.

More specifically the power pack is constructed as an electric oar having an elongated body with fins on one end thereof forming a shape similar to the paddle portion of an oar. A propeller is rotatably journalled on the finned end of the oar and the electric power unit is coaxially mounted near the other end of the oar. The oar has a mounting clamp between the propeller and power unit for universally mounting the oar on the rear of a boat in a manner to enable the depth of the propeller to be controlled and the boat to be steered.

Accordingly it is one object of the invention to provide a compact, economical, electric power pack for boats.

It is another object of the invention to provide an electric power pack of the type described above which is light in weight, portable and can be removably mounted on a boat.

It is a further object of the invention to provide a power pack of the type described above which resembles an oar having the propeller and electric power unit mounted thereon on the axis defined by the elongated body of the oar.

Other objects and features of novelty of the present invention will be specifically pointed out or will otherwise become apparent when referring, for a better understanding of the invention, to the following description taken in conjunction with the accompanying drawings.

BRIEF DESCRIPTION OF THE DRAWINGS

FIG. 1 is an elevational view of an electric oar embodying features of the invention, FIG. 2 is a plan view of the electric oar illustrated in FIG. 1, FIG. 3 is a fragmentary view of the underside of the propeller end of the electric oar illustrated in FIG. 1, and FIG. 4 is an enlarged cross sectional view of the power unit of the electric oar illustrated in FIG. 1.

DESCRIPTION OF THE PREFERRED EMBODIMENT

Referring to FIGS. 1–3 an electric oar 10 is illustrated which embodies features of the invention. It comprises an electric power unit 12 for driving a propeller 14 by means of a drive shaft 16. The propeller 14 is journalled on the end of a tubular body 18 having vertical fins 20 and 22 thereon with a cavitation plate 24 fixed to the vertical fin 22 and extending over the top of the propeller 14. The cavitation plate is perpendicular to the fins 20 and 22 and at an angle to the axis of rotation of the propeller. It reduces cavitation above the propeller in shallow water.

The tubular body 18 is connected to the power unit 12 by elongated spacer tubular body sections 17 and 26. A hand grip 36 is formed on the end of a tubular body section 37 projecting from the other side of the power unit 12. A mounting clamp 28 is connected to the body section 26 by a universal joint 30 so that the electric oar can pivot about a horizontal axis defined by stub-shafts 32 projecting from opposite sides of the body section, and a vertical axis defined by a stub-shaft 34 rotatably connected to the mounting clamp 28. With this construction the electric oar can be releasably clamped on the rear of a trolling boat, or the like, with the propeller in the water and the hand grip 36 in position to be controlled by the operator in the boat. The boat can be steered by pivoting the electric oar about the vertical axis defined by the shaft 34, and the depth of the propeller 14 can be controlled by pivoting the electric oar about the horizontal axis defined by the stub-shafts 32.

An electric cable 38 projects from the power unit 12 for connecting the plurality of small motors of the poewr unit to a conventional storage battery (not shown). A reverse switch 40 is provided for reversing the current flow to the motors to reverse the direction of rotation of the propeller 14, and a power switch 42 is provided for turning the motors on and off and for controlling the current flow to the motors in a manner to control the speed of the propeller. The power switch, by way of example, can include a simple variable resistor connected in series with the parallel connected motors of the power unit.

Referring to FIG. 4 the power unit 12 is illustrated in greater detail. The electric motors, pinion gears and internal ring gear (which will be described) are the same as those described in my aforementioned co-pending application. The power unit 12 comprises a circular mounting plate 50 having a tubular hub 52 at the center thereof and a cylindrical wall 54 projecting to the left from the outer periphery thereof. A small flange 56 projects radially from the periphery of the cylindrical wall 54.

Four small permanent magnet electric motors 58, two of which are shown in FIG. 4, are mounted on the right side of the mounting plate 50 with their drive shafts projecting through the mounting plate in position to support pinion gears 60 on the left side of the mounting plate. The permanent magnet motors 58 preferably are about one-eighth horsepower and the number of motors employed can be varied in accordance with the power desired, as described in my aforementioned co-pending application.

The pinion gears 60 mesh with a molded plastic internal ring gear 62, keyed to a drive plate 64 by a lug 66 projecting from the ring gear into a suitable recess in a cylindrical flange 68 of the drive plate 64 which surrounds the internal ring gear. The drive plate 64 has a hub 70 at the center thereof which is keyed to a stub-shaft 72 by a key 74. The stub-shaft 72 is rotatably journalled in the hub 52 of the mounting plate 50 by sleeve bearings 76 and 78. A head 80 is formed on the right end of the stub-shaft 72 and bears against a thrust washer 82 to limit axial movement in one direction. A coupling sleeve 84 is connected to the reduced left end of the stub-shaft 72 in position to lock a thrust washer 86 against a shoulder 88 of the stub-shaft and against the left end of the hub 70 to limit axial movement of the stub-shaft to the right. A pair of thrust washers 90 and 92 are positioned between the hubs 52 and 70 to provide a bearing surface between the hubs of the drive plate and the mounting plate. The drive plate 64 is reinforced by a plurality of radially extending webs 94 and the mounting plate 50 is similarly reinforced by a plurality of radially extending ribs 96.

With this construction the pinion gears 60 rotate the internal ring gear 62, the drive plate 64 and the stub-shaft 72 when the motors 58 are energized to drive the drive shaft 16 which is connected to the stub-shaft 72 by the coupling sleeve 84.

The tubular body section 37 extends over the right end of the boss 52 and is suitably connected thereto, such as by a screw 100. The motors 58 are enclosed by a housing 102 having a cylindrical portion 104 closely fitted about the body section 37 and a cylindrical wall 106 which abuts against the right side of the flange 56 and is secured to the cylindrical wall 54, such as by screws 108.

A housing 110 encloses the other side of the power unit. It has a cylindrical wall 112 abutting against the left side of the flange 56 which is secured to the cylindrical wall 54, such as by screws 114. A hub is formed at the center of the housing 110 and the right end of the body section 26 is suitably connected to this hub, such as by a screw 116.

In the event one of the motors should fail, it can easily be replaced by removing screws 108, sliding the housing 102 to the right on the body section 37, and detaching the motor from the mounting plate 50. In this regard the motors 58 have projecting bosses 120 which are positioned in locating holes 122 in the mounting plate 50. The locating holes have a greater diameter than the pinion gears 60 so that the pinion gear can be pulled through the locating holes 122 when the motor connected thereto is removed for replacement.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims. For example, a more permanent installation could be provided by mounting the power pack directly on the inside face of the rear transom of a boat with the propeller mounted on an extension of the stub-shaft 72 projecting through to the other side of the transom. A suitable seal would be provided about the stub-shaft to prevent water from entering through the hole in the transom. Two or more of these power packs could be symmetrically mounted on the rear transom to provide a multiple propeller drive for the boat.

Also the propeller could be mounted on the end of the tubular body 18 for rotation about an axis perpendicular to the drive shaft 16. The power pack could then be mounted on the rear of a boat in much the same manner as a conventional outboard motor. The spacing between the power unit 12 and the propeller would be reduced, of course, and the body section 37 eliminated or extended perpendicular to the power unit as a tiller for steering purposes.

What is claimed is:
1. An electric power pack comprising tubular supporting means, a propeller rotatably journalled on one end of said tubular supporting means, a power unit mounted on said tubular supporting means spaced from said one end, and drive shaft means extending within said tubular supporting means with one end thereof drivingly connected to said propeller and the other end thereof drivingly connected to said power unit, said power unit comprising an output member rotatably journalled therein coaxially aligned with said other end of said drive shaft means and drivingly connected to said other end of the drive shaft means, a plurality of fractional horsepower permanent magnet electric motors fixed about said output member and drivingly connected thereto, and coaxial housing means mounted on said tubular body and enclosing said power unit whereby the propeller is the only exposed rotatable element.

2. The power pack as defined in claim 1 wherein said output member is a gear and each of said motors has a gear on the output shaft thereof drivingly connected to said output gear.

3. The power pack as defined in claim 2 wherein said output gear is an internal ring gear and the axis of each of said motors is parallel to and spaced from the axis of a rotation of said internal ring gear, the gear on the output shaft of each of said motors being a pinion gear meshed directly with said internal ring gear.

4. The power pack as defined in claim 1 wherein the axis of rotation of said propeller is coaxially aligned with the axis defined by said tubular supporting means and the axis of rotation of said output gear, and including fin means on said tubular supporting means adjacent to said propeller, and a cavitation plate on said fin means extending outwardly of said fin means in position to overlie said propeller.

5. The power pack as defined in claim 4 wherein said fin means defines a plane passing substantially through the axis of rotation of said propeller, and said cavitation plate defines a plane perpendicular to the plane defined by said fin means and disposed at an acute angle relative to the axis or rotation to the propeller.

6. The power pack as defined in claim 3 including clamp means universally connected to said tubular supporting means intermediate said propeller and power unit for mounting the power pack on a boat.

7. An electric power pack comprising an electric power unit having a plurality of fractional horsepower permanent magnet motors drivingly connected to an output gear with the axis of rotation of each of said motors parallel to and spaced from the axis of rotation of said output gear, a drive shaft coaxially aligned with and having one end drivingly connected to said output gear, a propeller drivingly connected to the other end of said shaft for rotation thereby, means for mounting said power pack on a boat with a propeller in position to drive the boat, and housing means coaxial with said drive shaft and enclosing said motors and output gear.

References Cited

UNITED STATES PATENTS

| 486,684 | 11/1892 | Salisbury | 115—18 |
| 1,953,599 | 4/1934 | Grimes | 115—18 |
| 2,360,261 | 10/1944 | Noble | 115—34 X |

OTHER REFERENCES

Page 5 of 1935 Series Outboard Motors Elto Evinrude published by Outboard Motors Corp., Milwaukee, Wis.

ANDREW H. FARRELL, Primary Examiner